FIG.1

INVENTORS
ROBERT J. S. BROWN
HENRY C. TORREY
JAN KORRINGA

Dec. 28, 1965  R. J. S. BROWN ETAL  3,226,632
SPIN-ECHO WELL LOGGING
Filed April 2, 1962  5 Sheets-Sheet 2

INVENTORS
ROBERT J. S. BROWN
HENRY C. TORREY
JAN KORRINGA
BY
ATTORNEYS

INVENTORS
ROBERT J. S. BROWN
HENRY C. TORREY
JAN KORRINGA

Dec. 28, 1965  R. J. S. BROWN ETAL  3,226,632
SPIN-ECHO WELL LOGGING
Filed April 2, 1962  5 Sheets-Sheet 4

INVENTORS
ROBERT J. S. BROWN
HENRY C. TORREY
JAN KORRINGA

BY *PC Johnston*
*George W. Wasson*
ATTORNEYS

FIG.7

United States Patent Office 3,226,632
Patented Dec. 28, 1965

3,226,632
SPIN-ECHO WELL LOGGING
Robert J. S. Brown, Fullerton, Calif., Henry C. Torrey, Highland Park, N.J., and Jan Korringa, Columbus, Ohio, assignors to Chevron Research Company, a corporation of Delaware
Filed Apr. 2, 1962, Ser. No. 184,325
3 Claims. (Cl. 324—.5)

This application is a continuation-in-part of our copending application Serial No. 562,229 filed January 30, 1956 titled Method of Investigating the Surface Properties of Fluids, and now abandoned.

The present invention relates to a method of investigating the surface properties of fluids by nuclear magnetism, and more particularly, to a method of investigating the properties of fluids in porous media, whether said media are solid or liquid or a combination thereof, by determining the field dependence of relaxation functions for said fluids and the further dependence of said relaxation functions on properties of the porous media wherein said relaxation measurements are made. In accordance with the present invention the investigation of the foregoing properties of fluids is conducted by the detection of free precessional signals in the earth's magnetic field in the manner known as spin-echo.

In the petroleum industry a method for determining information concerning an earth formation from within a well bore penetrating the earth formation is identified by the term "well logging." The objective of oil well logging is the unambiguous detection of oil zones along the well bore. Many previously known well logging procedures present false indications of the presence of oil or present information that can be falsely interpreted as indicating the presence of an oil zone. In general, previously known well logging methods have been inexact because they do not derive information directly from oil, and only oil, within an earth formation. That is, previous well logging methods were more concerned with the environment along a well bore or the electrical characteristics along a well bore as criteria for identifying formations most likely to contain crude oils. Many of these previous well logging methods and the problems encountered in their use have been described in the parent of this application.

One of the most recent developments in well logging employs the techniques of nuclear magnetism. By those techniques the presence of protons of certain molecules can be detected. This manner of well logging provides for the unambiguous detection of oil zones along the well bore by identifying protons of hydrogen molecules within the formation; hydrogen in water and oil molecules are then distinguished to identify oil zones. The physics of the detection of signals from protons of the molecules is fully described in the parent application and is now generally known in the petroleum industry.

When a system such as quantity of gas, a liquid or a solid containing one specie of nucleus with a spin different from zero is placed in a magnetic field H its acquires a a nuclear magnetization. It takes a finite time before a state of thermal equilibrium is established, but once the equilibrium is reached the magnetization remains stationary as long as the magnetic field and other physical parameters, such as temperature and pressure of the system, are kept constant. Before this state is reached and from the moment at which the magnetic field is established, the nuclear magnetization and, therefore also, the angular momentum of the spinning nucleus experience a motion that can be described as a precession influenced by forces of friction. By precession is meant here a motion in which a quantity, such as the angular momentum remains constant in magnitude and changes its direction in space in such a manner that it describes a cone with constant angular velocity. The axis of this cone is parallel to the direction of the magnetic field H; the vertex angle of the cone depends on the state of affairs prior to the time at which the field was switched on and the angular frequency $\omega$, called the Larmor frequency. During a precessional motion the component of the angular momentum, and therefore also the magnetization, in the direction of the field is constant in magnitude. The component perpendicular to the field is also constant in magnitude but not in direction; it rotates at the angular frequency $\omega$. The influence of frictional forces is to diminish the perpendicular component until it becomes zero and to change the parallel component until it reaches a stationary value.

When more than one specie of nucleus with a spin different from zero is present in the system, each has its own processing polarization. In this case, there are also known to me mutual forces of friction that couple the changes in the precessional motion of different species. Strictly speaking, one must even discriminate between nuclei of one species in different states of chemical binding in the molecules; slight differences in magnetic screening by the electrons for chemical inequivalent nuclei cause a difference in the precession frequency. This event is known as chemical shift.

The phenomenon that is caused by the forces of friction and by which the system is enabled to approach theremal equilibrium is called relaxation. Due to the smallness of the nuclear magnetic dipole moments, the nuclear magnetism is too small to be measured easily with static methods. Most of the techniques designed to detect the behavior of nuclei in bulk matter in magnetic fields, including the present invention, take advantage of the existence of a finite response time connected with relaxation by subjecting the system to alternating fields or to fields that are changed abruptly from one value to another or to combinations of these together with constant fields. In particular, it has been found possible, by other investigators, and by the present inventors, to measure the mean value of the magnitude of the two components of the nuclear polarization parallel and perpendicular to an applied magnetic field for a nuclear component present in the system. As the changes due to relaxation are, in most cases of interest, very small in such a time interval, one is thus substantially able to measure these two components as a function of time.

When the nuclei of interest are associated in some molecular structures, and under certain magnetic field conditions, the time interval for the detection of the two components of nuclear polarization parallel and perpendicular to an applied magnetic field may become extremely short. In other circumstances the continued precession of the precessing polarization may be difficult to detect because the individual signal components making up the detectable signal may become out-of-phase so rapidly that the composite signal is undetectable. Under those circumstances it becomes necessary to devise new techniques for the identification of the presence of precessing nuclei by means other than the detection of damped precessional signals.

A method that may be used for the detection of precessional signals where other normal methods are unsuccessful has been identified as the "Spin-Echo" method. Perhaps the most common form of spin-echo operation is described in the publication entitled "Free Nuclear Induction" by E. L. Hahn in Physics Today, November 1953, pages 4–9. In that publication a sample is illustrated between the poles of a magnetic field generating means. The sample is further positioned in a manner to be subjected to an RF field at the frequency of precession of protons in the field generated by the magnetic poles. The RF field means is adapted to be energized to cause precession of the nuclear particles away from alignment, at thermal equilibrium, with the strong magnetic field. The RF field is then removed and the precessing nuclear particles are left in the position to which they have been rotated by the movement of their precession. The particles continue to precess with their axis of precession being parallel to the magnetic field generated by the strong magnetic poles. The angular rate of precession, however, for each of the individual protons may not be exactly the same and, as a result, the many precessing protons may soon get out of phase with one another.

If a second RF pulse of controlled time duration or strength is applied to the precessing protons of the sample, the protons can be reversed in phase or shifted 180°. If the second RF pulse is then removed, the precessing protons will continue their precession above the axis of the magnetic field from the strong magnetic poles. This continued precession of the protons may be considered as being in an opposite direction to their original angular rotation; the particles having been reversed through 180°. The mechanism that initially carried the protons to an out-of-phase condition now has been reversed with a result that at a time period after the termination of the second RF pulse equal to the time period between the first and the second RF pulses, these precessing protons will have returned to an in-phase condition of resonance as they were at the termination of the first RF pulse. This return to an in-phase condition may be detected by a suitable precession signal detection means and the signal may be displayed as an echo representing the extent of the polarization of the precessing protons after the magnetic moment had been tipped by the first RF pulse.

The strength of the echo signal, that is, its amplitude, may be employed to indicate the extent of polarization of the second RF pulse. Under some circumstances, this signal by itself, may indicate the extent of polarization. Under other circumstances additional signals may be needed to provide the necessary information for determining the extent of initial polarization. Regardless of the purpose for which the signal may be employed, it can be seen that the echo signal may be used to supply information concerning precessing protons when a free precession signal could not otherwise be detected. For example, the spin-echo signal may be derived even after individual precessing protons have become so out of phase with one another that the resultant spinning magnetic moment will have diminished to an undetectable level.

In the well logging techniques defined in the parent of this application a series of steps have been described that result in the eventual detection of signals from protons precessing in the earth's magnetic field. The protons are present in oil and water molecules in an earth formation. The precessing protons contributing to the detectable precession signal have been initially subjected to a polarization procedure. The polarization procedure was carefully controlled to affect preferential polarization of certain protons or to identify a field dependency for the polarization of protons within an earth formation so that, when the polarized protons were permitted to precess, the detected precessional signal might be used to establish information concerning the initial polarization. The parent application also has disclosed how this information may be employed to distinguish protons in water from protons in various forms of hydrocarbon crudes. The parent application describes the application of the spin-echo signal detection techniques as a manner for determining initial polarization. This application will further explain the spin-echo technique for a signal detection as applied to the operation of a well logging tool for distinguishing water and crude oil within an earth formation penetrated by a well bore.

The objects and features of the invention will be readily apparent to those skilled in the art from the specification and appended drawings illustrating a preferred embodiment wherein:

FIG. 3b shows a representative spin-echo signal that could be produced as a result of the polarization of FIG. 3a.

*New physics*

A pertinent theoretical aspect of the phenomena observed by us is that the nuclear spin relaxation mechanism in liquids is supplemented when the liquid is confined in small pores or dispersed in small droplets, or has solid particles dispersed in it, or is in any system having considerable surface-to-volume ratio. More particularly, we have observed that relaxation time $T_1$ of a liquid in small pores is shorter than the bulk relaxation time of that same liquid. Also variations in relaxation time with temperature are altered: in normal liquids, e.g. water, or fluid hydrocarbons with moderate or low viscosity, the bulk relaxation time, as shown above, is proportional to the ratio between the viscosity $\eta$ and the absolute temperature $\theta$. Pore-confined liquids, on the other hand, often have a weaker variation of the relaxation time with temperature. For water in some systems of small pores, for example, $T_1$ is independent of temperature. Also the dependency of $T_1$ on the relaxation field $H_r$ is altered. In the following the relaxation field will be denoted simply H except where other fields are also discussed. For simple fluids in bulk, relaxation time is known to be independent of H over a large interval ranging from $H=0$ to several thousand gauss. The relaxation time of pore-confined liquids in some cases, e.g. water in water-wettable sand, is independent of the field over a considerable range of field strengths, but the relaxation time increases markedly with H between 5 gauss and 200 gauss in other cases, e.g. water in drifilmed sand, oil in sand, or small oil drops in water.

We have developed a phenomenological theory that we believe accounts to a large degree for the observed facts in terms of properties of the bulk fluid, on the one hand, and the structure of surface layers and interfaces between fluids and solids or fluids, on the other. The shape and size of the pores enters as a geometrical factor that, in most cases of practical importance, is given by the surface-to-volume ratio of the fluid or a nuclear species within the fluid.

As was mentioned earlier, nuclear relaxation in fluids is primarily a function of the correlation time that characterizes the random motion of the molecules in the fluid. The response function of bulk fluids is an exponential function of time. The corresponding thermal relaxation time of the bulk fluid will in the following discussion be denoted by $T_{10}$, in contradistinction to the relaxation time of the same fluid in a porous medium, which will be symbolized by $T_1$. The correlation time in the bulk fluid will henceforth by symbolized by $\tau_{co}$: the use of the symbol $\tau_c$ will be explained presently. For the variation of $T_{10}$ with $\tau_{co}$ and with the Larmor frequency $\omega = \mu H$ we state the simplified theoretical formula $1/T_{10} = A\tau_{co}/(1+\omega^2\tau_{co}^2)$. The correlation time of fluids that are encountered in practice, except those of very high viscosity, as mentioned above, is such that $\tau_{co}\omega$ is much smaller than 1, and as a consequence, $T_{10}$ is approximately equal to $1/(A\tau_{co})$. Thus, $T_{10}$ is substantially independent of the field-strength H.

While it was originally thought that the surface of a liquid, formed against a boundary of a solid, would influence the nuclear relaxation process for the fluid at the interface of liquid and solid, it has since been discovered that the deep effect of this interface is not so noticeable in the measured relaxation times.

It has been suggested that near a boundary of dissimilar materials there exists a region where the molecules have reduced mobility compared with that of the bulk fluid. This region would have no sharp boundary but is probably a gradual change from a reduced value at the boundary to the value in the bulk fluid.

We will use this concept of the existence of a surface layer as a basis for our theoretical interpretation of the observed phenomena in nuclear relaxation of pore- confined liquids and the like. By comparing the results of our theory with the experiments, we have been able to conclude that nuclear relaxation studies provide in many instances an adequate tool to investigate said surface regions. We have assumed that in the vicinity of a pore surface or in the vicinity of an interface between two fluids, or in the vicinity of a particle suspended in a fluid, the molecules of the fluid are partially or totally immobilized. In such regions, therefore, there exists a local correlation time, that will be denoted by $\tau_c$, which is longer than the correlation time in the bulk fluid. We will define for convenience a "local relaxation time," to be symbolized by T, by means of the relation $1/T = A\tau_c/(1+\omega^2\tau_c^2)$ in analogy with the relation between $T_{10}$ and $\tau_{co}$. The local relaxation time stands in no direct relation to the results of a measurement. At a point where $\tau_c$ is longer than $\tau_{co}$, T is different from $T_{10}$, but not necessarily shorter than $T_{10}$.

On the other hand, we have found that the response functions for nuclear magnetic relaxation of simple systems are sums of terms of the form $A_k \exp(-t/T_k)$, which terms will be referred to as the components of $R(t)$. The constants $A_k$ will be referred to as the *amplitudes* of the components, and the constants $T_k$ will be referred to as the *relaxation times* of the components. For instance, we have observed that in a single small pore containing a simple fluid the response function is a single exponential and that the relaxation time depends on the size of the pore. If the response function is determined for a liquid filling a porous material whose pores are of different sizes, and if those sizes are continuously graded, the result will be a continuous distribution of terms having different relaxation times corresponding to the different pore sizes in the porous material. Thus the response function will be of the form $$R(t) = \int N(r) \exp(-rt) \, dr$$

where $r$ is the relaxation rate, or the reciprocal of the relaxation time, for a given component of the polarization represented by the response function $R(t)$. The quantity $N(r)$ is then proportional to the fraction of the initial polarization relaxing at rate $r$, and, in the case of a sample containing a single species of nucleus, having spin and represented by $R(t)$, it is seen that $N(r)$ is proportional to the number of such nuclei having the nuclear magnetic relaxation rate, $r$. In the case of fluid in a porous medium having different size pores, $N(r)$ is proportional to the amount of the fluid which is in pores of of the size represented by the relaxation rate $r$. In some applications of our invention it is desirable to determine at least some of the features of the function $N(r)$. For instance, a measurement of $N(r)$ permits determination of the average pore size of the porous material, and also the distribution of pore sizes. In turn, such distribution of pore sizes permits determination of the permeability of the material.

It may be noted that the response function $R(t)$ is substantially the Laplace transform of the distribution function $N(r)$. There are various mathematical methods for inverting the function $R(t)$ to obtain the function $N(r)$, depending on the accuracy with which $R(t)$ is determined experimentally.

An important, but not comprehensive, class of practical methods for determining the response function, $R(t)$ for the thermal relaxation of nuclear magnetic polarization will now be outlined. A sample of material containing nuclear magnetic moments is subjected to the following general consecutive steps:

(1) Subject the sample to a reproducible time sequence of magnetic fields. This sequence is predetermined according to the purposes of measurement, in a manner to be described later. The sequence of fields may comprise continuously-varying, or step-wise-carrying fields, including zero field, for prescribed lengths of time. (The purpose of Step 1 is to produce a reproducible state of nuclear magnetic polarization not in equilibrium with $H_r$, the relaxation field, in which it is desired to determine the course of relaxation.)

(2) Maintain the sample in the relaxation field $H_r$ for a time $t$. [In order not to confuse transverse and thermal relaxation it is necessary that $H_r$ be substantially parallel to the polarization at the end of Step 1, or else that the relaxation field $H_r$ be sufficiently inhomogeneous so that the polarization perpendicular to this field is quickly lost (and not refocused by any spin-echo procedure)]. In some special cases $H_r$ may be the earth's magnetic field $H_e$ in which case Step 3 following may be eliminated or used as a refocusing pulse.

(3) Subject the sample to a further reproducible time sequence of magnetic fields, which sequence is also predetermined according to the purposes of measurement.

(4) Observe a signal from the precessing polarization, this signal being a measurement of the polarization P at the end of Step 3 in the simplest case. In the spin-echo case the signal measured in Step 4 is proportional to polarization at the end of Step 1. (The experimental result at the end of Step 4 is a single value of the polarization P, which single value is dependent on the detailed procedures followed in the three preceding steps.)

The determination of the response function requires at least two values of the polarization, and preferably, many values. The additional values ore determined of repeating Steps 1 to 4 in every detail except that in each successive sequence of Steps 1 to 4, a different value $t$ is used in Step 2. The plurality of values of P so measured will usually show that P varies as $t$ is varied, and the values of P may be said to define a function of $t$, which may be denoted by the symbol $P(t)$. It will be understood, of course, that the actual experimental values of P are dependent on other quantities beside $t$, but that these other quantities are held substantially constant, or repreduced identically, in the various repetitions of Steps 1 to 4, so that the variation of P for the particular purposes at hand, is due only to the variation in $t$. The function $P(t)$, defined by the values of P measured for the various times, $t$, may be plotted as a graph or curve. The successive values may be otherwise represented, e.g., by automatic recorders, punch cards and the like. From the graph, or other representation, it will usually be possible to extrapolate the function in both directions, in order to obtain two particularly useful values of the function:

(1) the value that the function would have for $t=0$, which value may be denoted by the symbol $P(0)$, and
(2) the asymptotic value that the function would have for exceedingly large values of $t$, which value may be denoted by the symbol $P(\infty)$.

In dealing with the data from experiments such as those described, it is sometimes convenient to convert the polarization data into a normalized form, which has a value of unity at zero time, and a value of zero at infinite time. Such a form is provided by the quantity:

$$S(t) = \frac{P(t) - P(\infty)}{P(0) - P(\infty)}$$

the values of which function are herein called the *relaxation curve*. The definition of the relaxation curve is analogous to that of the response function. In the special case in which the above described Steps 1 to 4 are performed so that Step 1 results in a substantially equilibrium state of polarization (though not in equilibrium with $H_r$) and Step 3 is omitted, the obtained relaxation curve $S(t)$ is identical with the response function $R(t)$.

Just as the response function $R(t)$ for nuclear magnetic polarization may be inverted or resolved to obtain a distribution in relaxation rates $N(r)$, the measured relaxation curves $S(t)$ can be analyzed to obtain a corresponding distribution in relaxation rates $N'(r)$. In order to see the relationship between $R(t)$ and $S(t)$ and between $N(r)$ and $N'(r)$, it is easiest to consider separately a single component of $R(t)$. It is not necessary to say that this component of $R(t)$ represents some specific class of nucleus such as protons in certain size pores of a porous medium, though this may well be the case. This component is merely the part of $R(t)$ which decays exponentially with a given relaxation rate $r$ when in the magnetic field $H_r$. It is not required, and it is often not the case, that the physical source of this component of $R(t)$ at the field $H_r$ contribute a single exponentially relaxing component at some other relaxation field or that it contribute a single exponentially relaxing component to the transverse response function $R_2(t)$ at any field. It can be proved, however, that this exponentially relaxing component of $R(t)$ corresponds to a single exponentially relaxing component of $S(t)$, having the same relaxation rate, though not necessarily of the same amplitude.

The fact that the measurement by which we determine $S(t)$ is often not the "ideal" measurement in terms of which $R(t)$ is defined thus does not change the form of the contribution to the relaxation curve of the single component of $R(t)$ discussed above. This deviation from the "ideal" measurement does, however, affect the relative amplitudes of the contributions from different components of $R(t)$ having different relaxation rates.

If the distribution in relaxation rates $N'(r)$ is determined from the measured relaxation function $S(t)$, then it is possible to correct the function $N'(r)$ to obtain the function $N(r)$ if this happens to be necessary or desirable for the purpose at hand.

A simple example will be given of the relationship between a response function and two different relaxation curves corresponding to the same response function. Consider a sample for which the response function is $$R(t) = (\tfrac{1}{2})(\exp-10t + \exp-2t)$$

for a relaxation field of any strength, corresponding to equal amplitudes with relaxation times of 0.1 sec. and 0.5 sec. Next consider two different experimental measurements for obtaining relaxation curves.

First, let the system come to equilibrium with a strong magnetic field in Step 1 of our procedure for obtaining relaxation curves. Then in Step 2 expose the system to a magnetic field of zero strength for a time $t$. Then determine the polarization immediately after the end of this period. Repeat the process for various values of $t$. This method corresponds to the definition of the response function so our relaxation curve in this case is essentially the response function. The relaxation field in this case is zero.

As a second method, follow exactly the same procedure except to apply the strong magnetic field in Step 1 for only 0.1 sec. In this case the rapidly relaxing component is polarized at the beginning of Step 2 to a much greater extent than is the more slowly relaxing component. The relaxation curve in this case contains the same two relaxation rates, but the relative amplitudes of the two components are different:

$$S(t) = \frac{(1-\exp-10\times 0.1)\exp-10t + (1-\exp-2\times 0.1)\exp-2t}{(1-\exp-10\times 0.1)+(1-\exp-2\times 0.1)}$$

$$S(t) = 0.78 \exp-10t + 0.22 \exp-2t$$

It is seen that the second method of obtaining relaxation curves favors the more rapidly relaxing component but does not change its relaxation rate. Thus it may be found easier in the practical measurement to determine the higher relaxation rate by the method which reduces the contribution of the lower relaxation rate. The relaxation curve can be "corrected" to obtain the response function as long as the conditions of the measurements are known and as long as the relaxation times at the higher, as well as at the lower magnetic field strength are known. (In this simple example we assumed them to be the same at both fields.)

After the following detailed description of a preferred form of our apparatus, some further methods for measuring relaxation curves for porous media, within the scope of the above steps to produce the results of our invention, will be given.

*Our apparatus for determining relaxation curves*

Figure 1:
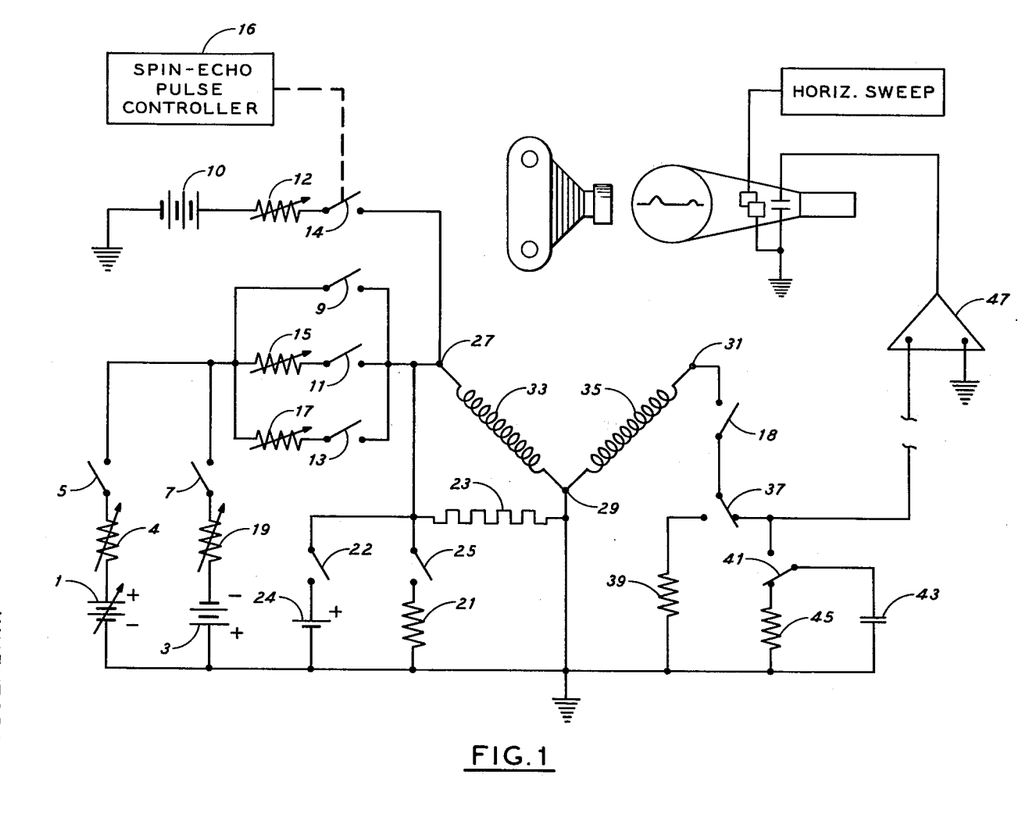
FIG. 1 is the basic circuit for a low-fluid nuclear magnetism apparatus.
Figure 7:
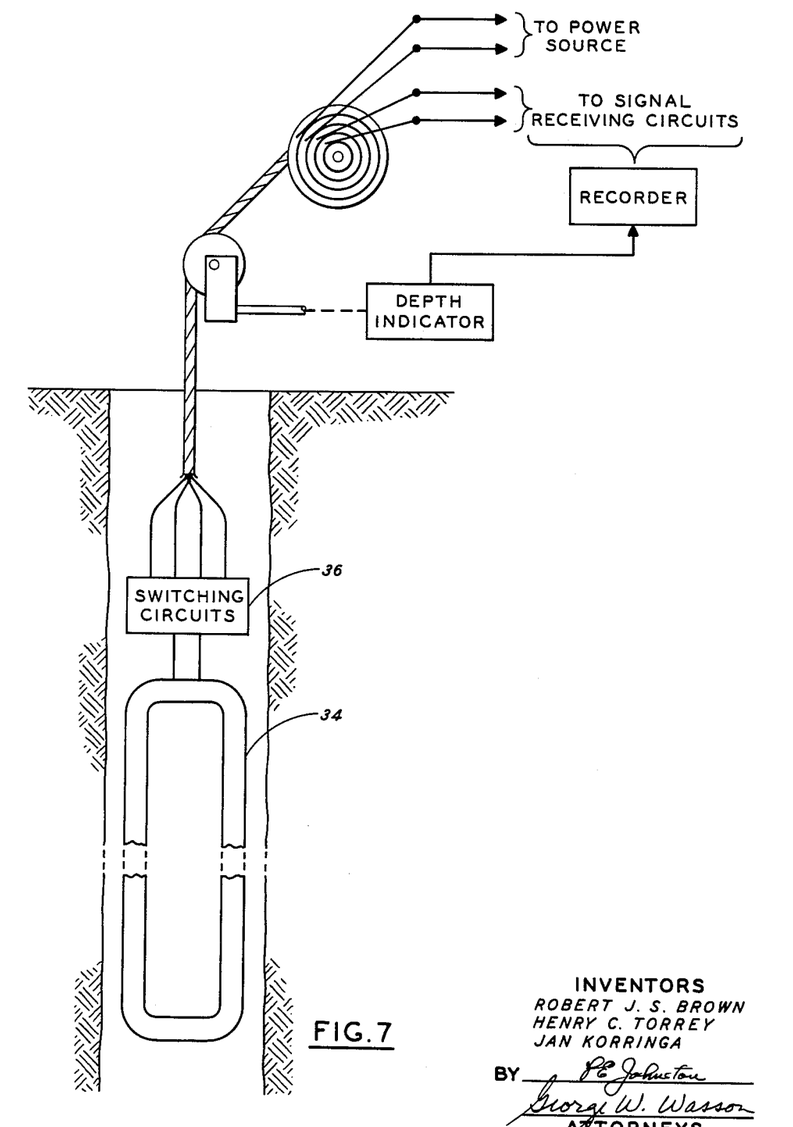
FIG. 7 is a schematic illustration of a well logging tool used in performing the present invention.

The basic circuit of our nuclear magnetism apparatus is shown in FIGS. 1 and 7. All the switches there shown—5, 7, 9, 11, 13, 22, 25, 37, and 41—are electrically operated relays. The timing circuits controlling them are not shown, because the construction of suitable timing circuits is a routine procedure for one skilled in the art of electronics. Certain details of the actual apparatus have been omitted for simplicity, where the details are not necessary for proper operation of the circuit. For instance, details of such circuits merely permit more economical use of the power source, such as batteries 1 or 3 or those that provide convenient monitoring of the operation.

Referring to FIG. 1, the inductance 33, called the polarizing coil, produces various magnetic fields required (in addition to a constant field, such as the earth's field) at the sample of matter being investigated. The inductance 35, called the pickup, or signal-receiving coil, has induced in it an electrical signal which is due to the precessing nuclear magnetic polarization in the sample. In our apparatus, the homogeneous field in which the nuclear magnetic polarization precesses is earth's field. Alternatively, this field can easily be supplied by Helmholtz coils or other artificial means. Furthermore, as shown in FIG. 7, coils 33 and 35 may be combined into a single coil 34 for both polarizing and signal-receiving with the use of appropriate switching circuits 36.

The shapes of the coils 33 and 35 depend on the application to which the apparatus is to be put. For some sample types it is convenient to use solenoidal coils. Despite a slightly lower efficiency, we have found it desirable to use elongated coils of the form shown in FIG. 7. With a coil of this form it is possible to make measurements of signal amplitudes and relaxation curves for samples both internal, and external, to the coil assembly. When two coils are used, the coils are desirably at right angles to each other in order to minimize the voltages induced in pickup coil 35 by the rapid flux changes through polarizing coil 33. The entire coil system is oriented with respect to the earth's field, or whatever field is used for the precession, so that the long dimension of the coil system has at least a component parallel to the external field. Thus each of the coils must be oriented so that the fields they produce have components not parallel to the external (earth's) field. When a single coil is used, points 27 and 31 of FIG. 1 are connected together, and either coil 33 or 35 is disconnected to establish the single coil system shown in FIG. 7.

When two coils are used, the signals from internal and external samples are in opposite phase. When only one coil is used the signals from internal and external samples are in the same phase. If only internal samples are of interest, the most efficient coil arrangement comprises a single coil in the form of a solenoid.

Returning to FIG. 1, it may be seen that there are substantially two separate circuits. To the left of point 29 is the circuit that controls the field producing polarization. To the right of point 29 is the signal detection circuit.

Figure 2A:
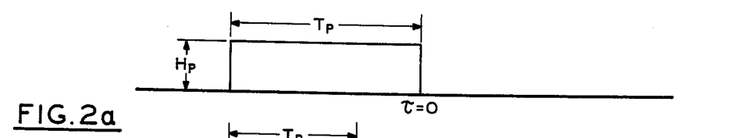
FIGS. 2a–2h show some basic current forms used in obtaining relaxation curves.
Figure 2B:
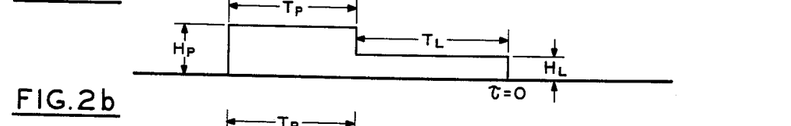
Figures 2C, 2D:
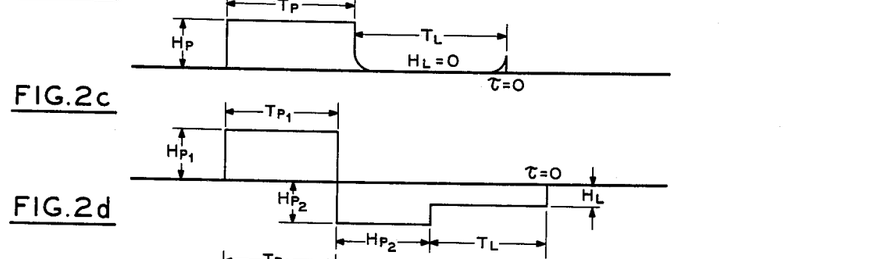
Figure 2E:
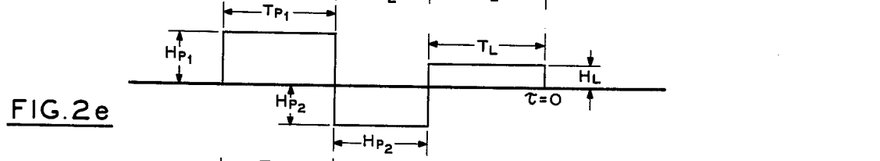
Figure 2F:
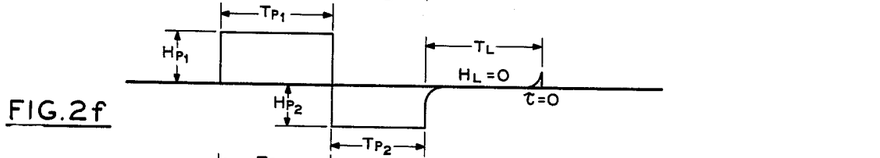
Figures 2G, 2H:
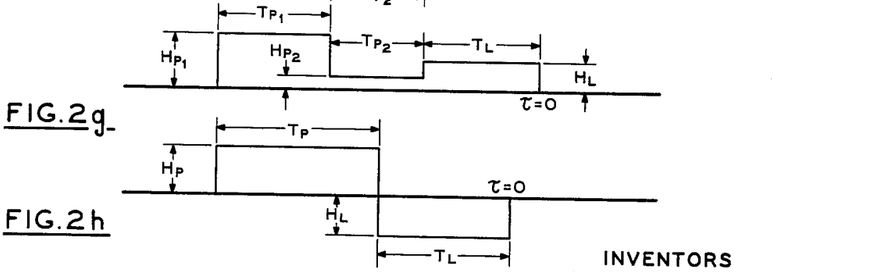

In FIGS. 2a to 2h there are shown qualitatively a number of different ways in which it is desirable to control the polarizing field as a function of time to accomplish the polarization necessary to perform the method of the present invention. The heights $H_P$, $H_L$, etc. in FIGS. 2a–2h represent field strengths; horizontal distance represents time indicated as $T_P$, $T_L$, etc. In each part of FIG. 2 a time is marked $\tau = 0$. This is the time when precession begins for the polarization to be measured. $\tau$ values greater than zero represent elapsed time during the detection and observation of individual signals due to previous polarizing procedures. In FIG. 2 several modes of variation of the field produced by the polarizing coil are shown, and in each case there are one, two, or three periods during which the field is held substantially constant. There are, of course, more general courses which the field could be made to take, but we show only a few of the most useful and simple ones. The advantages of the various patterns shown in FIG. 2 will be described later, but, first, certain time requirements must be mentioned. If the direction of the total resultant magnetic field to which polarization is subject turns at an angular rate which is much greater than the value of the precession rate in the field, then the polarization will be unable to follow the change in direction of the resultant magnetic field. This is called a sudden change in direction of the magnetic field. If, however, the resultant magnetic field turns at an angular rate which is small compared to the precession rate in the field, then the polarization will turn the magnetic field. This is called an "adiabatic" change in direction of the magnetic field. If the field is changed in direction adiabatically; and if, before the change, the polarization was precessing about the resultant field at a certain angle, then after the adiabatic change in direction (possibly accompanied by a change in magnitude) the polarization will still precess about the new resultant field, at the same angle with which it previously precessed about the original field. All the field changes shown in FIG. 2 must be made in times short compared to the times $T_P$, $T_{P1}$, $T_{P2}$, and $T_L$ shown for the times of application of the various values of field strength produced by coil 33 or 34. When the field produced by the coil 33 or 34 crosses zero and when the field is brought to zero at $\tau = 0$, the changes in direction of the resultant magnetic field must be sudden in the sense defined above for a substantial part of the change in direction. Only the field produced by coil 33 or coil 34 when polarizing is represented in FIGS. 2a and 2h. There is present also the earth's field with a direction component at right angles to the field produced by these coils. As long as the field produced by the coil is strong compared to the earth's field, the change in direction of the resultant is very slight; and, furthermore, the precession rate is very high in the strong field, making it almost impossible to vary the field so fast that the rate of change of direction of the resultant is comparable to the rate of precession of the nuclear magnetic polarization. Thus, the changes of the direction of the resultant field are adiabatic (or slow) as long as the field produced by coil 33 or 34 is strong compared to the earth's field. When the constant field in which the precession is observed is the earth's field, the requirement that the direction of the resultant field change suddenly for a substantial part of the change of the direction makes it desirable that the field produced by coil 33 change at a rate of about $10^5$ gauss per second during the time it is comparable in strength to the strength of the earth's field.

In FIGS. 2c and 2f, the field produced by the polarizing coil is reduced to zero adiabatically at the beginning of the time $T_L$, and it is brought up adiabatically to a few gauss (several times stronger than the earth's field) just before the end of the time interval $T_L$. Then at $\tau = 0$ the field is suddenly reduced to zero. As was mentioned above, it is almost impossible not to make any changes adiabatically that are made when the field produced by the coil is strong compared to the earth's field. When it is desired to reduce the field of the coil to zero adiabatically, it is necessary to change the field by not more than the strength of the earth's field in a time which is that for several cycles of precession in the earth's field. The precession frequency in the earth's field for protons is on the order of two kilocycles, and the earth's field is about one-half gauss. It is thus desirable to change the field produced by coil 33 or 34 at a rate of not more than about 300 gauss per second when the field of the coil has a strength comparable to that of the earth's field.

With further reference to FIGS. 2c and 2f, the times at which the field adiabatically changes when comparable in strength to the earth's field are indicated by a curved line rather than square corners. In these two particular cases the polarization before the beginning of the period $T_L$ is (as in all other cases of FIG. 2 also) substantially parallel to the field of polarizing coil but at the beginning of the period $T_L$ the polarization follows in direction (not in magnitude) the adiabatically turning resultant of the field produced by the coil and the earth's field. Thus, shortly after the beginning of the period $T_L$ all the polarization is oriented parallel to the earth's field. During this period the polarization does not precess, because only the part of the polarization which is perpendicular to the earth's field precesses. Just before the end of the period $T_L$ the polarization is made to follow the adiabatically turning resultant of the field produced by the coil and the earth's field while the field of the coil is being slowly increased from zero to several gauss. After the field of the coil has reached several gauss the polarization then has once again a part which is not parallel to the earth's field. The field of the coil is suddenly reduced to zero, at which time the polarization begins to precess about the earth's field. The precessing polarization then induces an alternating signal in the pickup coil 35 or in coil 34 now switched to a signal-receiving circuit. The detected signal provides a measure of the polarization.

We will now describe operation of the circuit of FIG. 1 to produce the various current forms and hence the field in the region of the polarizing coil, as illustrated in FIGS. 2a to 2h. It should be understood that any reference to energization of coil 33 will also apply to energization of coil 34 when connected for polarization and that reference to coil 35 will also apply to coil 34 when connected for signal detection.

FIG. 2a: Starting with all relays open except 5, resistor 4 in series with relay 5 is set so that the current through coil 33 will correspond to the desired field strength $H_P$. In this case, this is also the relaxation field $H_r$ in which the course of relaxation is to be determined. Then, relay 9 is closed at the beginning of time interval $T_P$ and opened at the end of this interval. Thus, in FIG. 2a, the time $T_P$ is also the time $t$ used in the relaxation curve.

FIG. 2b: Resistor 4 is adjusted to correspond to the desired field $H_P$ and resistor 15 is set to correspond to desired field $H_L$, and all relays except 5 are open. At the beginning of $T_P$ contact 9 is closed and soon thereafter so is contact 11. At end of $T_P$ contact 9 is opened, and at end of $T_L$ contact 11 is opened. In this case, either the field $H_P$ or the field $H_L$ can be the relaxation field, and the corresponding times $T_P$ and $T_L$ can correspond to the time $t$ of the relaxation curve which is varied for repeated observations of the signal to determine various points on the relaxation curve for the porous media under observation.

FIG. 2c: Starting with only relays 5 and 25 closed, and adjusting resistor 4 as usual, relay 9 is closed at the beginning of $T_P$ and opened at the end of $T_P$. Then relay 25 is opened after current in coil 33 has dropped to zero. Just before $\tau=0$ relay 22 is closed for a short time (one or two milliseconds) and opened again at $\tau=0$. It is to be noted here that the field $H_L$ is zero, leaving only the earth's field. In this case, even with an external sample we can observe relaxation in a uniform field, whereas in all other cases with an external sample the relaxation field cannot be uniform (though most of the signal comes from a region over which the field varies in amplitude by a factor of about two). As in the program of FIG. 2b, either the field $H_P$, or the resultant of $H_L$, and earth's field can be used as the relaxation field.

FIG. 2d: Resistor 4 is set to zero; battery 1 adjusted for the desired value of $H_{P_1}$; resistor 19 is set for $H_{P_2}$ and resistor 15 adjusted for $H_L$. As before, all relays are open except relay 5. Relay 9 is closed to begin $T_{P_1}$; relay 7 is closed just before (few milliseconds) the end of $T_{P_1}$; relay 5 is then opened to end of $T_{P_1}$. Relay 11 is then closed and relay 9 opened to end $T_{P_2}$. At $\tau=0$, relay 11 is opened. Any of these three fields can be used as the relaxation field, with the corresponding time being varied in repeated observations of the signal and used as time $t$ in the relaxation curves.

FIG. 2e: The procedure is like that described for FIG. 2d until after the beginning of $T_{P_2}$. Then the voltage of battery 11 is raised to the fixed voltage of battery 3. Resistor 4 is set to provide the desired value of $H_L$ (preferably less than $H_{P_2}$). Just before (about a millisec) the end of $T_{P_2}$, relay 5 is closed. At end of $T_{P_2}$ relay 7 is opened to begin $H_L$, and at $\tau=0$ relay 9 is opened.

FIG. 2f: As in FIG. 2d, the conditions are made the same until after the beginning of $T_{P_2}$. Then, relay 25 is closed and at end of $T_{P_2}$ relay 9 opens. Relay 25 then opens after current has dropped to zero. Just before $\tau=0$, relay 22 is closed to connect battery 24 to coil 33. This circuit is held for just long enough to permit field to build up a few gauss (a few millisecs) and then opened at $\tau=0$.

FIG. 2g: With all switches open except 5, D.C. source 1 is set for a desired $H_{P_1}$, resistor 15 is adjusted for $H_{P_2}$, and resistor 17 is set for $H_L$. Closing of relay 9 begins $T_{P_1}$; the closing of relay 11 and opening of relay 9 ends $T_{P_1}$ and starts $T_{P_2}$. Closing of relay 13 ends and begins $T_L$. The opening of relay 5 is at $\tau=0$.

FIG. 2h: Like FIG. 2d, $H_P$ is applied for $T_P$ and $H_L$ is applied in the same manner as $H_{P_2}$. Relay 9 is opened at $\tau=0$.

It will now be readily apparent from the previous specific examples how to obtain other desirable sequences of fields for measuring relaxation curves. Voltage source 3 must be large enough to produce a sudden (in above sense) change of magnetic field when the polarizing field is nearly zero. Voltage source 1 must be adjustable in moderate steps from nearly zero to about the voltage of source 3. It is desirable to use as high a voltage as possible, limiting the current through 1 or 3 to desired values by resistors 4 and 19, in order to cause the polarizing field to rise as fast as possible. The switches 5, 7, 9, 11, 13, and 22, are vacuum-insulated switches in our apparatus, though we have used other switches satisfactorily for some of them. Resistor 23 is a nonlinear resistor, such as thyrite, which limits the voltages developed across coil 33 when various switches are opened. It does not interfere with the "sudden" reduction of the polarizing current, in the sense of sudden used above. Suitable values for the components in the circuit of FIG. 1 are the following: variable source 1, 0–500 volts D.C.; source 3, 500 volts D.C.; and source 24, 1 volt. Resistor 21, 5 ohms; thyrite resistor 23, 600 volts at 55 amps. Polarizing coil 33, 1 ohm and 99 millihenries; pickup coil 35, 12 ohms and 0.13 henry. Resistor 39, 6.8K; resistor 45, 100 ohms; condenser 43 is adjustable, as required to tune coil 35 to nuclear precession frequency. Amplifier 47 has a high signal-to-noise ratio and high input impendance with a gain of about $10^4$.

It is desirable in our particular arrangement of coils to disconnect tuning condenser 43 from pickup coil 35 for a short period of time, ending a few milliseconds after $\tau=0$. This prevents transient electrical currents induced by changes in the fields produced by the polarizing coil, from producing other fields that would interfere with the required "sudden" removal of the polarizing fields. Relay 37 is used to open this parallel circuit between condenser 43 and coil 35. While tuning condenser 43 is disconnected, the pickup coil 35 is connected by relay 37 to a damping resistor 39 that absorbs much of the energy left in the fields of coil 35 at $\tau=0$. From the time of first application of a polarizing field until a few milliseconds after $\tau=0$, relays 37 and 41 are held in their energized positions. FIG. 1 shows these relays in their unenergized positions.

In well logging the procedure is first to obtain a polarization of the protons present in oil and water in the formation by means of magnetic fields produced by an electrical coil system within the well bore. Current flow in the coil is cut off to reduce the applied magnetic field, and then one observes the signals induced within the well bore by the precession in the earth's magnetic field of the previously induced proton polarization. One or more relaxation curves for the fluids present in the formation is determined, and desired information is deduced from these curves. Since the relaxation curves are obtained, it matters little at what rate the actual observed signals decreased as functions of time except that they must be of sufficient duration to permit accurate measure of the initial intensities of the signals. Under some circumstances the duration of detectable precessional signals may be extremely short or, as previously explained, the in-phase precession of a sufficient number of protons may be so short that a measurable precessional signal does not exist at the time that precessional signals are to be detected. When those circumstances occur, it becomes imperative that another method be devised for determining the extent of polarization existing at termination of the polarizing field so that the information may be obtained to construct the relaxation curves. The previously described spin-echo technique is available to obtain this information.

The equipment used to perform spin-echo well logging is as shown in FIGS. 1 and 7. The double coil system of FIG. 1 employing polarizing coil 33 and pickup or signal receiving coil 35 may be used, or preferably the single coil system of FIG. 7 may be used to both polarize the protons and detect the precessional signals therefrom. The polarizing procedure described with respect to FIGS. 2a–2h establishes the eventual proton polarization. After the polarization field has been removed in a manner to initiate precession of the previously polarized protons in the earth's magnetic field, and after the precession has continued for a prescribed period of time, the polarizing field 33 is re-energized through a programmed operation of relay 5 and the selected circuits including relays 9, 11, and 13. As an alternative, a special circuit may be connected between terminal 27 and ground including a battery 10, an adjustable resistor 12 to relay 14 and a spin-echo pulse controller 16 for operation of the relay contacts 14. This circuit may provide the energization to coil 33 to produce the necessary refocusing pulse during the period that the polarized protons are precessing in the earth's magnetic field. After the refocusing pulse has been applied by the polarizing coil, the pickup or signal-receiving coil and its associated circuits at the signal detection side of FIG. 1 may be connected to prepare the circuit for reception of precessional signals. An additional relay contact 18 may be provided between terminal 31 and relay contact 37 including mechanically synchronized operation with contacts 14 so that the signal detection circuits will be isolated from the pickup or signal-receiving coil except when the spin-echo pulse is to be detected. The spin-echo signals will exist generally for twice the period of the refocusing pulse and will be detectable at a time during the precession period generally occurring at twice the time interval between the initiation of precession and the application of the refocusing pulse. The signal detection circuits will therefore have had ample time to become electrically stabilized and prepared for the detection of precessional signals.

Figure 3A:
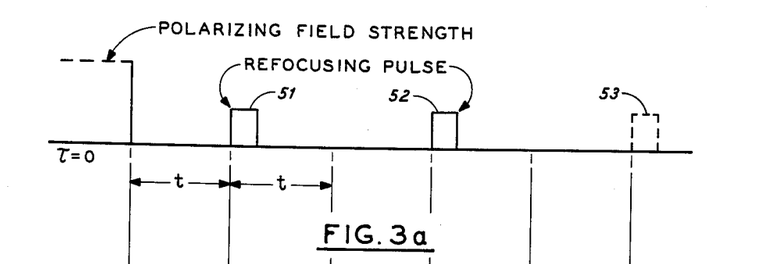
FIG. 3a shows a representative polarization coil energization for producing spin-echo signals.

FIG. 3a illustrates an energization program for the generation of a spin-echo pulse from free precessing protons in the earth's magnetic field. At time $\tau=0$ the previous polarization program illustrated in any one of the diagrams of FIGS. 2a through 2h is completed and the polarizing field is removed rapidly. At that time precession of the protons begins about the only remaining magnetic field within the earth formation, the earth's magnetic field. After time t, a first refocusing pulse is applied to reorient the resulting precession of the protons precessing in the earth's magnetic field. At a second time t later, the reoriented precessing moment will produce a signal surge representing an echo in response to the application of the refocusing pulse. The refocusing pulse as illustrated in FIG. 3a is many times longer than necessary and longer than is actually used. If sufficient power is available, and if the circuits can be switched rapidly enough, the pulse need be only of 180° duration. The pulse is shown as having a large width merely as illustrative and it should be understood that its total duration should be small in comparison to the time t so that the echo will appear substantially at time 2t.

The reorientation pulse is illustrated in FIG. 3a and may be a single pulse 51 or a series of pulses 52, 53, etc. The measured signal is in the form shown in FIG. 3b. A normal free precession signal without reorientation could assume the form generally illustrated by the dot-dash line 54 if the protons contributing to the signal were in a homogeneous precessional field. The time duration for a free precession signal in the earth's magnetic field in an ideal environment could be in the range of hundreds of milliseconds or as long as several seconds. However, where the environment of the protons causes an inhomogeneous precession field or where the field itself without external or environmental persuasion is inhomogeneous, a detected precessional signal could be of the type generally illustrated by the dotted line 55. Time duration in this case could be in the range of microseconds to perhaps 50 milliseconds.

Figure 3B:
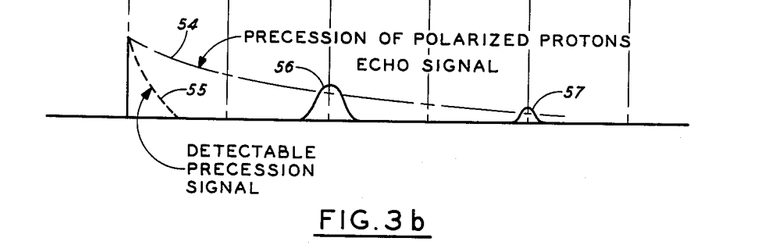

It should be understood that the signal illustrated in FIG. 3b is the detectable signal of in-phase precession and not an indication of the total quantity of precessing protons. Whether the detectable signal is of the time duration of signal 54 or of signal 55 is totally dependent upon the time duration of the generally in-phase precession of the previously polarized protons. Furthermore, even where a free precession signal of the duration illustrated by signal 55 is encountered, there will generally still be precessing protons existing for quite some time, even perhaps longer than the time illustrated by signal 54. The purpose of the reorienting pulse is to permit the detection of signals from these precessing protons after the in-phase type precessional signal is no longer detectable.

The loss of detectable signal is at least partially due to the out-of-phasing of the individual protons. Some protons being in a relatively stronger field than others will precess faster and soon be rotationally ahead of the others. The converse is true for those protons in relatively weaker fields. The purpose of reorientation is to cancel out these rotational effects and to bring the protons back to an in-phase condition.

FIG. 3b illustrates the spin-echo signals that may be detected at 56 and 57. At the time of application of the refocusing pulse, a signal could be induced in a signal could be induced in a signal detection coil where a two-coil logging system is employed; however, these signals may be eliminated by appropriate circuits for blocking the amplifier. With the refocusing pulse the resultant precessing moment has been reoriented during the period that the pulse was applied so that the individual components of the precessing moment that had been precessing at a faster pace than other precessing components will be retarded in phase. The retarded components will be later brought back into an in-phase condition with respect to other individual components of the precessing moment that were originally precessing at a slower angular speed. The result of the refocusing is the generation of a spin-echo pulse at time 2t with its amplitude proportional to the extent of polarization at the time of the termination of the polarizing field. Under ideal conditions the echo pulse could be expected to be due to a return to in-phase by all of the protons that were polarized after the polarization procedure had been completed; however, in that an inhomogeneous refocusing field is employed, not all of tre refocused protons are brought to a precisely in-phase condition at the same time. For that reason the echo pulse is broadened but centers around time 2t.

As illustrated in both FIGS. 3a and 3b, additional refocusing pulses may be applied and additional spin-echo signals may be detected. This may continue generally so long as the precession of the polarized protons continues even though the precessional signal could not be detected from these precessing protons in other manners.

Figure 4A:
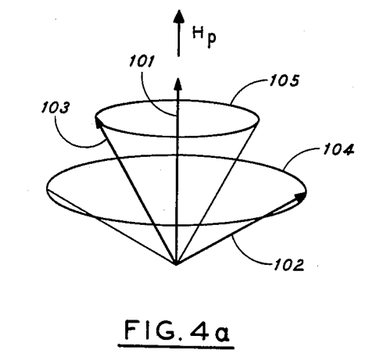
FIGS. 4a–4h are a series of vector diagrams helpful in explaining the production of spin-echo signals.

In FIGS. 4a to 4h a simplified vector representation of the process of producing a spin-echo is illustrated. In FIG. 4a, a vector 101 is illustrated as being generally in alignment with the direction of the polarizing field $H_p$. It is well understood by those skilled in the art that the resultant vector 101 is really made up of components such as vectors 102 and 103 each precessing in its own conical path 104 and 105, respectively, about the direction of the polarizing field $H_p$; the individual components 102 and 103 are in reality the resultant of many individual protons precessing in this illustrated conical path.

Figure 4B:
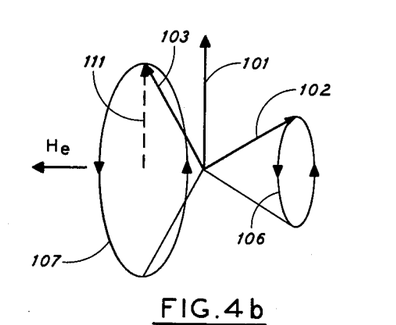
Figure 4C:
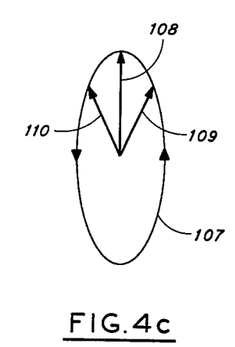
Figure 4D:
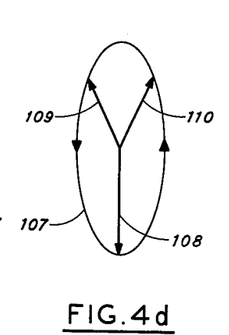

In FIG. 4b the resultant polarization vectors 102 and 103 are shown in the position they might be expected to assume after the polarization field $H_p$ has been removed and the polarized protons are subjected to the precessional field, the earth's magnetic field $H_e$. These resultant vectors will now begin a conical precession somewhat in the paths 106 and 107, respectively. If the vector 103 and its conical path 107 is now considered alone, it may be seen that a component of the polarization that it comprises may be shown as a vector 111. That vector may in time be represented by several component vectors 108, 109, and 110, as illustrated in FIG. 4c; vector 110 being rotationally ahead and vector 109 being behind vector 108. These vectors will begin to fan out in the conical path 107 to represent the out-of-phasing of the precessional signal as individual protons are subjected to relatively larger and smaller precessional fields. As illustrtrated in FIG. 4d, the eventual complete out-of-phasing of the resultant vector may be accomplished in due time so that, in effect, no precessional signal may be detected from the precessing component represented by the original vector 103. If, during the out-of-phasing of the precession, a magnetic field having an orientation the same as the initial polarization field is applied to the precessing protons, the many individual components of this out-of-phase precession may be reoriented to result in an exchange of position of the faster and slower component vectors.

Figure 4E:
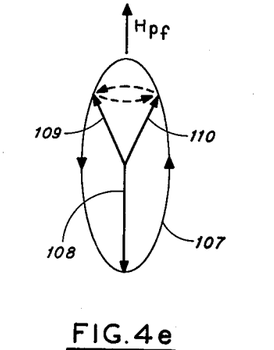

FIG. 4e illustrates this exchange of position of the faster and slower component vectors by illustrating the effect of the refocusing field on the component vectors 108, 109, and 110 representing the resultant vector 103. If the refocusing pulse is applied for the time period required for a 180° pulse, the resultant position after the termination of the pulse will be as illustrated by components 108', 109', and 110' having been rotated through the dotted path of FIG. 4e. It should be understood that, when the vectors are considered as spinning gyroscopes and the force of the refocusing field $H_{pf}$ considered as a mechanical force on the gyroscopes, the movement of precision will cause the gyroscope to move in the paths of the dotted arrows to the position illustrated by the component vectors 108', 109', and 110'.

Figure 4F:
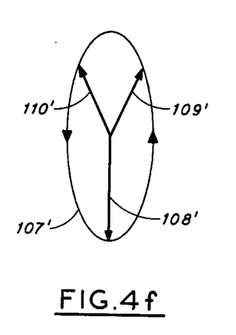

Referring now to FIG. 4f, it may be seen that the components 109' and 110' have been exchanged with respect to an axis parallel to $H_{pf}$; while component 108' has not been moved. The positions of the components have now been reversed while the direction of rotation remains the same. On the other hand, the individual protons represented by the components 108', 109', and 110' have not been moved from their relative physical position; they are therefore still being subjected to the same relatively larger or relatively smaller precessional fields. The individual protons will therefore continue their precession at the same angular rate. All things being equal, a proton represented by component vector 110' will now continue at its faster pace than a proton represented by the component vector 108', and a proton represented by the component vector 109' will continue at its slower pace than a proton represented by the component vector 108'. On the other hand, these components have exchanged their positions with respect to component vector 108'. In the scheme of their rotation, component 109' is now ahead of components 108' and 110' rather than behind.

Figure 4G:
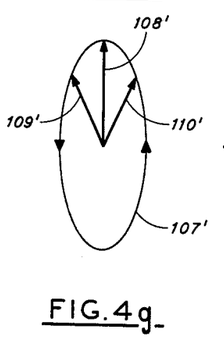
Figure 4H:
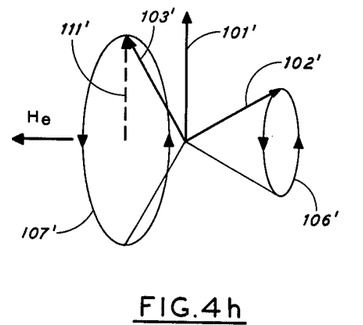

As illustrated in FIG. 4g, these component vectors will eventually come back into alignment in the same manner that they gradually went out of alignment as illustrated in FIG. 4c. At the time represented by FIG. 4h, all of the individual components representing the out-of-phasing due to different speeds of angular rotation for the many polarized protons will have returned to in-phase condition to again form a resultant precessing polarization as represented by vector 101' having its components 102' and 103' brought back into phase by the refocusing pulse. There having been no physical movement of the protons represented by components 108, 109, and 110, these protons will be subjected to the same precession field inhomogeneities. The return to in-phase and the resultant echo signal will therefore occur at generally the full time period after the application of the refocusing pulse represented by the time period between the application of the refocusing pulse and the initiation of the precession by removal of the original polarizing field. The existence and generation of an echo pulse is not limited by the measurable free precessional signal that could have been detected in the usual earth's magnetic field free precession signal measurement. If there is any remaining polarization of the protons existing at the time of the application of the refocusing pulse, the precessing protons from that polarization may be brought back into phase and their echo pulse may be detected within the limits of the signal-to-noise ratio of the well logging tool.

The foregoing vector analysis of the generation of an echo signal pulse from protons polarized in a first field and precessing in another field is, of course, idealized. It has been shown, however, that echo pulses can be detected from precessing protons even though the precession field may be somewhat inhomogeneous and even though simple free precession signals may be difficult to detect because of the difficulties involved in the electronics of switching circuits.

An advantage of the spin-echo type signal is its time duration. It should be readily obvious that the spin-echo signal will build up to a maximum signal strength representing the precessing vector at the time the echo pulse occurs. That vector is a function of the original extent of polarization after the polarizing field was removed. The signal will build up and decline taking the same period of time in each half and will therefore be twice as long as the normal declining precessional signal. The echo signal will therefore be a simpler means for determining the extent of original polarization in that it is both long enough and generally strong enough as well as occurring at a time when the electronic circuits of a well logging tool can be unblocked.

As represented in FIG. 3a a second refocusing pulse may again be applied and a second spin-echo signal may be detected so long as there is a precessing polarization at the time that the refocusing pulse is applied. The strength of the detected echo signals may then be used to both reconstruct the amount of polarization that must have existed at the time that the polarizing field was removed and, with several runs of this nature, the relaxation curve for the particular protons in question may be constructed. From that information the response function for nuclear magnetic relaxation may be determined as a manner for distinguishing between water and oil, for determining properties of the porous media within which these protons are located, and for determining certain information concerning viscosity for the precessing protons.

The refocusing pulse as illustrated in FIG. 3a has been shown and described primarily as a D.C. pulse. It should be understood that an oscillating pulse may also be applied to accomplish the refocusing function. For the most efficient operatoin the pulse would be at the Larmor frequency of the precessing proton, about 2 kc. in the earth's magnetic field, for a period long enough to accomplish a substantial 180° rotation of the precessing polarization. The time duration for application of a refocusing pulse will be longer for an oscillating pulse than for a D.C. pulse and will be predetermined to accomplish the greatest amount of refocusing of the precessing resultant polarization.

It will now be useful to mention several simple types of response functions, and to show convenient methods for determining their natures by obtaining experimental relaxation curves.

Figure 5:
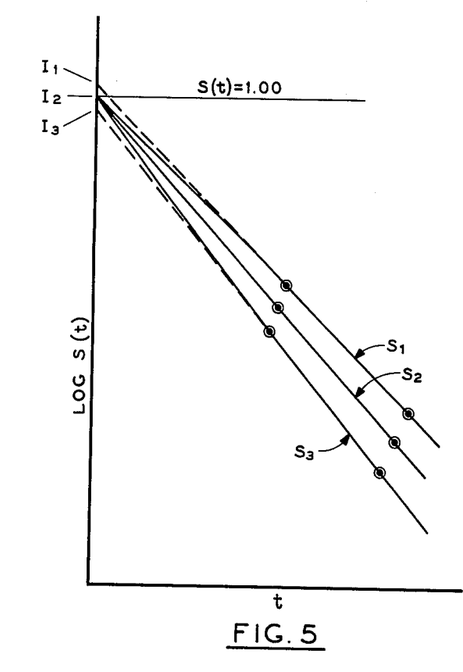
FIG. 5 illustrates a relaxation curve that may be constructed from measured nuclear magnetism signals.

In many cases it is known from the nature of the porous media under investigation that its response function must be approximately a single experimental function, but with an unknown relaxation rate. Ordinarily, then, it is desired to determine two things by making measurements: the number of protons (or other nuclei having magnetic moments) in the fluid phase, and the relaxation rate, or relaxation time. The relaxation rate, or relaxation time, may be determined by performing several of the polarization programs illustrated in FIGS. 2a–2h, so that successive observations may be made of signals to determine successive points on the relaxation curve. For the observation of the response function it is often convenient to plot the relaxation curves on semilog graph paper or to plot the logarithms of the relaxation curve versus $t$ as shown in FIG. 5. In the special case for porous media, where the response functions has a single component, the relaxation curve is identical with the response function.

The situation sometimes arises where it is known that the response function of a sample includes a component of unknown amplitude but of definitely known relaxation rate. In this case, it is possible to eliminate completely the one component by one of the methods of FIGS. 2d–2e. It is often known in advance that the response function for a sample is composed substantially of two components of unknown relaxation rates. Likewise, the amplitudes of the two components may also be unknown. Under these circumstances, the separate components determined experimentally may be recorded or plotted on semi-log graph paper; the relaxation curve obtained experimentally will then approximate the response function. For large values of $t$ the logarithm of the relaxation curve approaches a straight line corresponding to a smaller relaxation rate. If this straight line part of the curve is extrapolated to $t=0$, the intercept is equal to the fraction of the initial polarization corresponding to the smaller relaxation rate.

Further useful data may be taken from a system known to contain two components of unknown relaxation rates and unknown amplitudes by taking relaxation curves such that at least one component is zero or negative. These procedures are shown in FIGS. $2d$–$2g$. The duration or strength of $H_{p2}$ is varied until the relaxation curve is a straight line, in which case one of the components of the relaxation curve will have been eliminated completely. To determine this setting of the duration or strength of $H_{p2}$, one need determine only three points of the curve $S(t)$ corresponding to each setting. Several such curves are shown in FIG. 5. Curves $S_1$, $S_2$, and $S_3$ are all plotted to pass through $S(t)=0$ at $t=0$. The dashed lines are straight lines drawn through the experimental points shown by the circles. The relaxation rate or the relaxation time of the more slowly relaxing component may be determined directly from $S_2$ by measuring the slope. A similar measurement can be made to determine the relaxation time and the relaxation rate of the more readily relaxing component by eliminating the more slowly relaxing one. The two values of the relaxation rates can be combined with the measured value for $r_0$ to determine the amplitudes of the two components of the response function.

Figure 6:
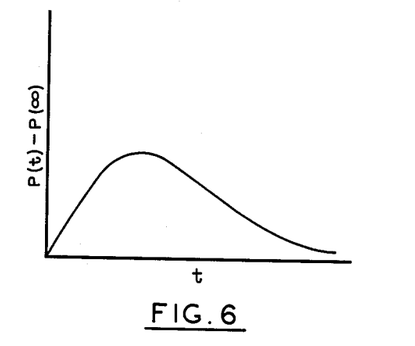
FIG. 6 is a polarization curve after the elimination of initial polarization.

It is also possible to adjust the duration of $H_{p2}$ so that the total polarization is exactly the amount in equilibrium in $H_r$ or a very small amount less. In this case the component with the larger relaxation rate makes a negative contribution which cancels the contribution of the more slowly relaxing component at $t=0$. However, the curve of $P(t)-P(\infty)$ rises to a maximum and decays again as shown in FIG. 6. In many cases thhe amplitude of the maximum of the curve of FIG. 6 can be used as a measure of the difference between the two relaxation rates.

The signal measurements from which the information plotted in FIGS. 5 and 6 is derived may be made in accordance with the spin-echo techniques previously described. The polarization procedures will be those illustrated in FIGS. $2a$–$2h$ to establish the polarization necessary to derive the spin-echo signals.

Partly by way of summary, there are at least three general results of the nuclear magnetic relaxation measurements derived from the foregoing procedure which would indicate oil in an underground formation.

(1) Appreciable dependence on the relaxation field strength indicates oil. The only circumstance under which the relaxation curves for water could show field dependence except at very high fields would be if water were in contact with an oil-wet formation, and this situation does not occur.

(2) If data are obtained at more than one temperature, then appreciable temperature dependence of the relaxation curves indicates presence of oil, except in the case where the water is in droplets in oil where the oil wets a preferentially oil-wettable formation.

(3) The appearance of more than one component to the relaxation curves indicates oil except in a few formation types, primarily vugular carbonate reservoirs. It is possible to obtain a distribution of relaxation rates for water in a porous medium as has been explained above, but this distribution is rather narrow in most sandstones. In vugular limestones, however, it is possible to have some pores which are very large and some that are very small.

In the case of water-wet limestone some indication of the presence of oil can often be gained from the field dependence. Another possibility is to flush the formation with a material containing colloids, paramagnetic ions or molecules more soluble in the water than in the oil. Often the approximate oil gravity and, therefore, relaxation times, are known, or the pore sizes of the vugular formation are known.

It is possible in sandstones, or any formation, that there should be no field dependence and only one relaxation time observed. The possible presence of oil can generally be proven, or can be ruled out, if observations can be made at more than one temperature, but this is often not convenient for well logging. This "coincidence" arises when water and a rather viscous oil are together in rather large, but uniform, water-wet pores. The two fluids can be distinguished if data at more than one temperature can be obtained. Another possibility is the poisoning of the formation with a paramagnetic material soluble only in one of the fluids.

There are a number of other important applications of nuclear magnetism measurements in logging that are not primarily for the detection of the presence of oil, but for the measurement of other factors of interest. For example, frequently the permeability of the formation penetrated by the well bore can be determined from nuclear magnetism measurements. First, the pore size, or volume-to-surface ratio, is determined from the signals observed from water. In a water sand the pore size may be inferred directly from the relaxation rate for the water signal. For oil sands the pore size must be determined first by determining the effective pore volume for the spaces containing water. Then the relative quantities of oil and water present are determined from the relative initial intensities of the signal from oil and water. Next the ratio of the volume of the entire pore space to the volume occupied by water is calculated. (Thus the effective pore size, or volume, may be determined either in a water sand or an oil sand.) Finally, the well-known relationship between the size of the pores and the permeability of the formation is applied. This procedure is valid in many instances, where knowledge of the pore size distribution for a formation provides a good measure of the permeability of the formation. Permeability is an extremely important quantity, since it alone may determine whether or not an oil zone is a commercial oil zone. Yet, prior to this invention, there has been no generally satisfactory method available for determining such formation permeability.

It should be noted here that the duration of the nuclear magnetic precession of protons in the earth's magnetic field will be sufficiently long that observable signals may be obtained only if the fluid is present in pores having their minimum dimension greater than a certain distance of the order of some fraction of a micron. It so happens, further, that fluid is free to flow from pore to pore only if the minimum dimension of the pores is at least of the same order of magnitude as this fraction of a micron. Therefore, in one sense the nuclear magnetism log is a log of the amount of fluid present that is free to flow; in other words, it is a log of free fluid. This concept is in agreement with the concept that the nuclear magnetism log can provide a measurement of permeability.

*Applications of new results*

In oil well logging it is now possible by our invention to detect unambiguously the presence of oil when it is present in appreciable quantity. First of all, the nuclear magnetic signal from oil shows a change in relaxation time as the strength of the relaxation magnetic field is changed (field dependence), whereas the signal from water shows no such change. Secondly, for light oils, we have found that some of the oil is completely surrounded by water and has one relaxation time, whereas a second part of the oil touches the rock and has a different relaxation time. For very viscous oils the change in relaxation time brought about by the boundary layer itself as magnetic field strength is changed may be inappreciable. For viscous oils, however, it is found from measurements on the oil in bulk that a nonexponential relaxation is observed, and hence for viscous oils in porous media observation of such nonexponential relaxation is indicative. The distribution of pore size of the formation is determinable from the water signal because the water signal is not influenced by temperature or strength of magnetic field but only by pore size and wettability properties of the formation. In water-wettable, water-filled sands, one can infer pore size distribution directly from the water signal. In oil sands, one can infer the amount of pore volume for the water and then by comparing the signal intensities from water and oil the amount of oil present can be measured. Then from the combination of water and oil signals one can determine the pore size distribution. Knowing the pore size of the formation and the relaxation time, or relaxation curve, for the oil, it is possible to deduce the viscosity of the oil, as well as the gas-oil ratio. Since pore size distribution generally is related rather well to formation permeability, except in vugular type formations and certain other unusual formations, the present invention provides a method to obtain a measurement of permeability under many situations.

While certain preferred embodiments of the invention have been specifically disclosed, it should be understood that the invention is not limited thereto as many variations will be readily apparent to those skilled in the art and the invention is to be given its broadest possible interpretation within the terms of the following claims.

We claim:

1. An earth's magnetic field free precession method for determining the response function to polarization for polarizable protons within a portion of an earth formation penetrated by a well bore, comprising the steps of:
   (a) establishing a controllable first unidirectional magnetic field from within said well bore adjacent to said portion of said earth formation to polarize said polarizable protons,
   (b) interrupting said first unidirectional field to initiate free precession of said polarized protons in the earth's magnetic field,
   (c) during said free precession and a predetermined time period after interruption of said first unidirectional field, establishing a second unidirectional field of greater strength than said earth's magnetic field and oriented in the same direction as said first magnetic field to refocus said precessing polarized protons,
   (d) detecting a spin-echo free precession signal from said refocused precessing polarized protons,
   (e) repeating the foregoing steps at least once again with a different predetermined time period for establishing said second unidirectional field,
   (f) and detecting spin-echo free precession signals after each of said repeated steps,
   (g) constructing a relaxation curve from said detected spin-echo signals,
   (h) constructing additional relaxation curves from spin-echo signals determined with different controllable first magnetic fields,
   (i) and comparing said constructed relaxation curves to determine the response function to polarization for said polarizable protons.

2. The method of claim 1 wherein said establishing of said first magnetic field and said second magnetic field is repeated with different energization procedures for said first magnetic field particularly designed to control the polarization of protons in certain earth formations, and wherein said comparison of said determined response function is responsive to the effect of said earth formations on the polarization of polarized protons in said earth formation as an indication of the type of earth formation wherein said protons are confined.

3. An earth's magnetic field free precession method for determining the response function to polarization for polarizable protons within a portion of an earth formation penetrated by a well bore, comprising the steps of:
   (a) establishing a controllable first unidirectional magnetic field from within said well bore adjacent to said portion of said earth formation to polarize said polarizable protons,
   (b) interrupting said first unidirectional magnetic field to initiate free precession of said polarized protons in the earth's magnetic field,
   (c) during said free precession and at a predetermined time period after interruption of said first unidirectional field establishing a series of second unidirectional magnetic field pulses of greater strength than said earth's magnetic field and oriented in the same direction as said first magnetic field to refocus said precessing polarized protons, said predetermined time period being less than the thermal relaxation time for said polarized protons, and said second magnetic field pulses being spaced in time by intervals larger than said predetermined time period,
   (d) detecting spin-echo free precession signals from said refocused precessing polarization after each of said second magnetic field pulses,
   (e) constructing a relaxation curve for said precessing polarization contributing to said detected spin-echo signals,
   (f) repeating said foregoing steps at least once again with a different established first magnetic field in each repeated procedure, and constructing a relaxation curve for the precessing polarization after each repeated procedure,
   (g) and comparing said constructed relaxation curves to determine the response function to polarization with said different established first magnetic fields.

References Cited by the Examiner

UNITED STATES PATENTS

| | | | |
|---|---|---|---|
| 2,968,761 | 1/1961 | Zimmerman et al. | 324—0.5 |
| 2,999,204 | 9/1961 | Jones et al. | 324—0.5 |

OTHER REFERENCES

Bloom et al.: Physical Review, vol. 93, No. 4, Feb. 15, 1954, page 941.

Zimmerman et al.: Journal of Physical Chemistry, vol. 61, No. 10, October 1957, pp. 1328 to 1333 incl.

Powles et al.: Nature, vol. 180, No. 4598, Dec. 14, 1957, pp. 1344 and 1345.

Powles et al.: Archives des Sciences, vol. 11, Special Colloque Ampere, July 1958, pp. 209 to 214.

CHESTER L. JUSTUS, *Primary Examiner.*

MAYNARD R. WILBUR, *Examiner.*